(No Model.)
E. N. DICKERSON.
PROCESS OF PRODUCING ACETYLENE GAS.
No. 561,701. Patented June 9, 1896.
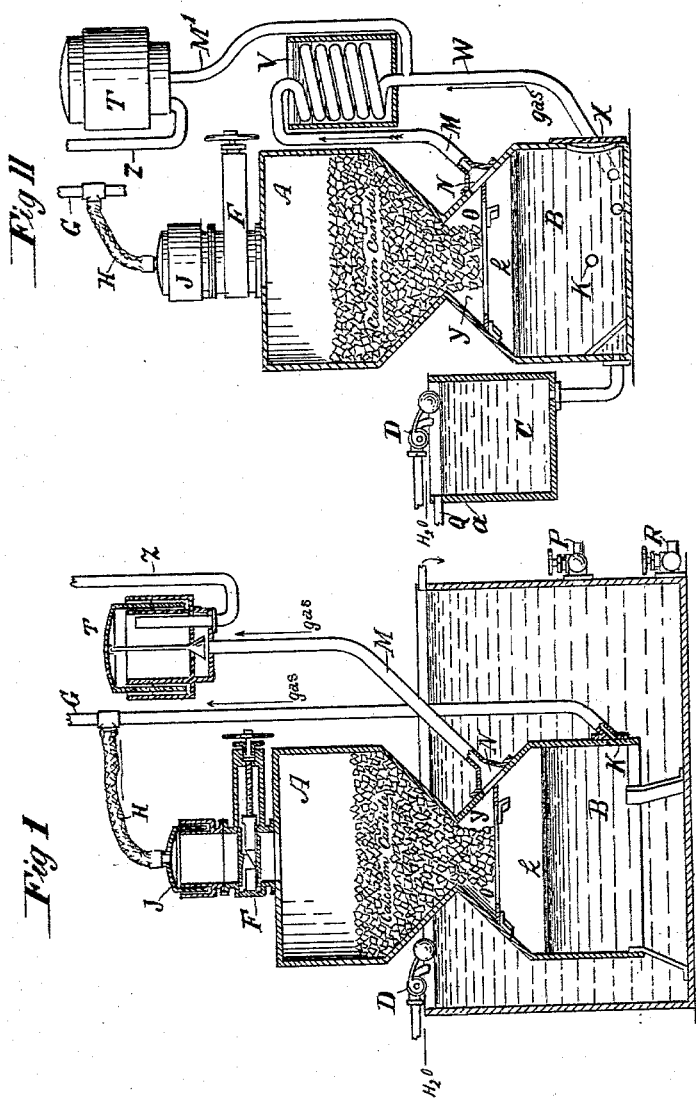
WITNESSES:
INVENTOR

UNITED STATES PATENT OFFICE.

EDWARD N. DICKERSON, OF NEW YORK, N. Y.

PROCESS OF PRODUCING ACETYLENE GAS.

SPECIFICATION forming part of Letters Patent No. 561,701, dated June 9, 1896.

Application filed November 27, 1895. Serial No. 570,265. (No specimens.)

*To all whom it may concern:*

Be it known that I, EDWARD N. DICKERSON, of No. 253 Broadway, in the city, county, and State of New York, have invented a new and useful Improvement in Processes for the Production of Acetylene Gas, of which the following is a full, true, and exact description, reference being had to the accompanying drawings.

This invention relates to an improvement in processes by means of which gas is produced from the union of water and a solid material, such as calcium carbide, which can be affected by the vapor of the water.

My process is applicable to many constructions, and by way of illustration I have shown a construction for which I have obtained Letters Patent of the United States on the 18th day of June, 1895, No. 541,429, to which patent I refer for a fuller description of this apparatus.

Said apparatus consists generally of a chamber A, containing calcium carbide, the calcium carbide being fed to this chamber by means of the valve F. The calcium carbide rests upon the grating O in the lower chamber B, the whole apparatus being supported in a vessel containing water C. The gas generated by the action of the water on the calcium carbide escapes through the gas-pipe M, past regulator T, to service Z. In case it is desired to use a condenser in the outlet, such condenser may be used, as shown at V, Figure 2, the condensed water passing backward to the water-chamber B through pipe W and the gas escaping through pipe M'. In case gas should exist in the chamber B to the level of the opening K, Fig. 1, it will then escape through the opening K and pipe G to the atmosphere. The cover J over the valve F communicates by a flexible tube H with the pipe G, so as to allow any escape of the gas which may pass by the valve. A constant level of water in the supply vessel may be maintained by the float-valve D. A film of oil floating upon the surface of the water is shown at $k$.

In apparatus of this kind in which contact is made between the calcium carbide and water for the generation of the gas and in which a separation occurs between the water and the calcium carbide by reason of the pressure of the gas causing a difference in level between the water and the calcium carbide, either by depressing the water or raising the calcium carbide, it is found that, notwithstanding such separation, the vapors of water will continue to affect the calcium carbide, producing gas at a time when it may not be desired. I have discovered a means to prevent such generation excepting when the water and the calcium carbide are in contact with each other. This means consists in a film of a liquid not containing water and the specific gravity of which is less than water, so that it floats upon the surface of the water—such, for instance, as lubricating cylinder oil—though I do not limit myself to this material. Any such liquid which will float upon the surface of the water and which does not itself contain water will be efficacious. Under these circumstances as soon as the water-level is lowered the oil floating upon its surface prevents the evaporation of the water and the consequent attack of the calcium carbide by the vapors of the water.

My invention is shown in the accompanying drawings, in which a film of oil $k$ is shown floating upon the surface of the water within the lower chamber B. In this apparatus this film of oil will rise and fall within that lower chamber, as shown in Fig. 1, without passing into the outer chamber. By this process and apparatus, therefore, gas is only produced when the pressure is sufficiently reduced to allow the actual contact of the water with the calcium carbide, the generation stopping as soon as the water-level leaves the calcium carbide.

What I claim as my invention, and desire to secure by Letters Patent, is—

The process of generating acetylene gas from calcium carbide or similar gas-producing material, which consists in alternately bringing together said calcium carbide and water, and then separating the water from the calcium carbide, and of preventing the evaporation of the water when it is separated from the calcium carbide, by covering the said water with a liquid film, thereby preventing the action between the vapor of the water and the carbide when the water and carbide are separated, substantially as described.

In testimony whereof I have signed my name to this specification in the presence of two subscribing witnesses.

E. N. DICKERSON.

Witnesses:
   CHARLES E. FOSTER,
   W. CLARENCE DUVALL.